UNITED STATES PATENT OFFICE.

EMIL HELBIG, OF FRANKFORT-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

PERMANENTLY-STABLE, DRY BACTERIA PREPARATIONS AND PROCESS OF MAKING SAME.

1,288,582.   Specification of Letters Patent.   Patented Dec. 24, 1918.

No Drawing.   Application filed June 28, 1915.   Serial No. 36,742.

*To all whom it may concern:*

Be it known that I, EMIL HELBIG, Dr. Pol. Sc., pharmaceutical chemist, a citizen of the Empire of Germany, residing at Frankfort-on-the-Main, Germany, have invented certain new and useful Improvements in Permanently-Stable Dry Bacteria Preparations and Processes of Making Same, of which the following is a specification.

Bacteria preparations for therapeutic and diagnostic purposes are not injected in their original concentration, but, before their administration, they must, as a rule, be made up in a suitable manner with a physiological salt solution or carbolic acid solution and, in most cases, be very strongly diluted. It is difficult and troublesome for pharmacists and physicians to prepare such dilutions of an exactly determined potency, which also causes in most cases considerable waste of valuable substance. However ready-made solutions or suspensions prepared for storage show in practice the disadvantage that their efficiency very much diminishes after being kept in store for some time.

For instance Koch's "old"-tuberculin retains in the originial concentration its specific efficiency for many years without undergoing any change, whereas a dilution thereof made in the proportion of for instance 1:1000 becomes already a few days after its preparation considerably weaker in its specific efficiency.

Attempts were made, particularly with tubercle-bacilli preparations to convert them by chemical or physical manipulations into dry preparations, that is to say into a form, for instance into tablets—if required with the addition of common salt or another injectable substance—in which even minute quantities of said preparations are stable and can easily be dosed. However the hitherto proposed working-conditions proved to be detrimental to the specific substances and the dry preparations thus obtained were soluble in water only with great difficulty.

Now, as is known, unstable, liquid or moist substances can be brought to dryness and rendered stable, by mixing them with anhydrids of certain salts. Thus there were used by Stökkel, Fränkel and Elfer sodium sulfate and di-sodium phosphate respectively for drying serum—and other organic preparations, because it is not possible to extract in another way the water from them without considerable difficulty (see *Pharmazeutische Zentralhalle*, page 1085, statement from *Wiener Klinische Wochenschrift* 1910 No. 43; *Biochemische Zeitschrift*, vol. 28, 1910, page 330 *ff.*; and vol. 40, 1912, page 138 *ff.*) In all the cases described in the above references it does not matter at all whether or not the dry preparation obtained, which is chiefly intended to be used as an intermediate product for other purposes, is greatly increased in volume and quantity as compared with the parent-material.

However in preparing a dry tuberculin or other bacteria-preparation for subcutaneous injections one must endeavor to obtain the same as highly-concentrated as possible and to use only a minimum of salt, so that it may not become necessary to use later on too large quantities of the dissolving liquid and of the dilutions ready for use.

There is no difficulty in concentrating the various tubercle-bacilli preparations in a vacuum over a dehydrating agent to such an extent that they constitute then merely a mixture of chemical and specific substances in glycerin. All attempts hitherto made to dry and bind the said preparations in a practicably suitable form without detrimentally affecting their efficiency, were in every way unsuccessful, and the solution of this problem constitutes the subject matter of my present invention.

I have ascertained that it is not possible to prepare a dry tuberculin of 100 per cent. strength neither by means of sodium phosphate nor by means of sodium sulfate. As to sodium carbonate, although this possesses the property of drying tuberculin of high concentration, it causes a total destruction of the specific substances contained in the bacteria preparations. Guinea pigs artificially infected with tuberculosis survived even after they had been injected with from 0.1–0.15 grams of tuberculin prepared with sodium carbonate, whereas they died, like the control animals, in the course of 1–2 days after being injected with the same quantity of liquid old tuberculin.

However it is easily possible by means of sodium tetraborate (borax) to obtain dry preparations containing 100 per cent. and even a higher percentage, that is, preparations one gram of which is equal to the same quantity or more of the previously liquid parent material. This undoubtedly means an important new technical improvement, particularly as the bacteria preparation when treated in this manner remains entirely active and retains its original physiological properties.

The stable dry preparation obtained by means of borax kills a tuberculous guineapig in the same quantity and time as does a corresponding fresh dilution of tuberculin without the addition of the said salt. The dry preparation obtained by using borax also produces typical precipitates with specific tuberculosis serum in exactly the same way as does a freshly-prepared pure tuberculin-solution of the same concentration.

The amount of specific substances contained in the tuberculin mixture may be calculated from the degree of dilution in which precipitation still occurs.

The glycerin contained in the tubercle-bacilli preparations does not constitute a preservative but a substituent which is *a priori* an indispensable condition in obtaining for instance tuberculin. It is an inconvenient admixture which greatly impedes the drying process, but which cannot be avoided, because tubercle bacilli only grow in a broth containing glycerin. The manufacture of a dry preparation made from a culture containing no glycerin would be by far easier and more simple, however it is entirely impracticable to withdraw the glycerin from the "original" tuberculin because this would be detrimental to its original properties and because glycerin has the effect of greatly improving the solubility of the borax in water.

The glycerin added to the tubercle-bacilli emulsion is also not intended to act as a preserving, but as an emulsifying agent. Nor does the borax added to the tuberculin act as a preservative, but as a water- and glycerin-binding agent. There is no need for a preservation because undiluted tuberculin is as such indefinitely stable.

The following example illustrates my invention:

200 cc. of tuberculin containing 20 per cent. of glycerin are concentrated in the presence of a dehydrating agent in vacuo without heating, taking precaution to keep it sterile. After being reduced to 100 grams, the residue is triturated with 100 grams of dehydrated borax and placed over sulfuric acid until a homogeneous, dry, crystalline mass is obtained.

By mixing the finely-powered substance with common salt or sterile milk-sugar, trituration of various percentage strength, corresponding to the homeopathic triturations can be prepared. They can be compressed into exactly dosed tablets which, when being used, are dissolved in water in determined quantities easily to be injected.

Having now described my invention, what I claim is:

1. The process of converting bacteria preparations into permanently stable dry preparations, suitable for making injection liquids ready for use, which process consists in mixing these preparations with dehydrated borax in sufficient proportion to yield a dry preparation.

2. The process of converting bacteria preparations into permanently stable, dry preparations suitable for making injection-liquids ready for use, which process consists in mixing these preparations with dehydrated borax in presence of glycerin, the borax in sufficient proportion to yield a dry preparation.

3. As new compositions of matter, permanently stable, dry bacteria preparations suitable for making injection-liquids ready for use, said compositions of matter consisting of a mixture of bacteria preparations with dehydrated borax.

4. As new compositions of matter, permanently stable, dry bacteria preparations suitable for making injection-liquids ready for use, said compositions of matter consisting of a mixture of bacteria prepartions with dehydrated borax and glycerin.

5. As a new composition of matter, a permanently stable, dry tuberculin preparation suitable for making injection-liquids ready for use, said composition of matter consisting of a mixture of tuberculin with dehydrated borax, the latter in sufficient proportion to yield a dry preparation.

In testimony whereof I affix my signature in presence of two witnesses.

DR. EMIL HELBIG.

Witnesses:
JEAN GRUND,
CARL GRUND.